US012031544B2

(12) United States Patent
Fukui et al.

(10) Patent No.: US 12,031,544 B2
(45) Date of Patent: Jul. 9, 2024

(54) FAN

(71) Applicant: Mitsubishi Electric Corporation, Tokyo (JP)

(72) Inventors: Tomoya Fukui, Tokyo (JP); Makoto Tanishima, Tokyo (JP); Ryutaro Asano, Tokyo (JP); Kisho Hatakenaka, Tokyo (JP); Kenichi Sakoda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/035,326

(22) PCT Filed: Dec. 23, 2020

(86) PCT No.: PCT/JP2020/048170
§ 371 (c)(1),
(2) Date: May 4, 2023

(87) PCT Pub. No.: WO2022/137388
PCT Pub. Date: Jun. 30, 2022

(65) Prior Publication Data
US 2023/0407876 A1 Dec. 21, 2023

(51) Int. Cl.
*F04D 29/54* (2006.01)
*F04D 29/16* (2006.01)

(52) U.S. Cl.
CPC ......... *F04D 29/164* (2013.01); *F04D 29/547* (2013.01); *F05D 2250/51* (2013.01)

(58) Field of Classification Search
CPC ............................. F04D 29/545; F04D 29/547
See application file for complete search history.

(56) References Cited

U.S. PATENT DOCUMENTS 4,566,852 A * 1/1986 Hauser .................. F04D 29/545 416/189
5,443,363 A * 8/1995 Cho ...................... F04D 29/164 415/223

(Continued)

FOREIGN PATENT DOCUMENTS

JP 3491342 B2 1/2004
JP 2010-523884 A 7/2010

OTHER PUBLICATIONS

International Search Report and Written Opinion mailed on Mar. 9, 2021, received for PCT Application PCT/JP2020/048170, filed on Dec. 23, 2020, 9 pages including English Translation.

*Primary Examiner* — Christopher R Legendre
(74) *Attorney, Agent, or Firm* — XSENSUS LLP

(57) ABSTRACT

A fan includes an impeller including a boss and a plurality of blades; an air guide portion through which an airflow moves from one end to the other end of the air guide portion; and a bell mouth defining a first suction passage inside the bell mouth and defining, together with an inner surface of the air guide portion, a second suction passage outside the bell mouth. Between an upstream end point located in an inlet of the first suction passage and a downstream end point located in an outlet of the first suction passage of the bell mouth, the bell mouth includes a minimum possible radius point to which a distance, in a radial direction, from a rotation axis of the boss is smaller than a distance, in the radial direction, from the rotation axis to the downstream end point.

10 Claims, 7 Drawing Sheets

(56) References Cited

U.S. PATENT DOCUMENTS

| | | | | |
|---|---|---|---|---|
| 5,551,841 | A | 9/1996 | Kamada | |
| 9,890,791 | B2 * | 2/2018 | Innocenti | F04D 29/403 |
| 11,428,238 | B2 * | 8/2022 | Haaf | F04D 29/325 |
| 11,692,553 | B2 * | 7/2023 | Haaf | F04D 17/06 417/423.1 |
| 2008/0075585 | A1 * | 3/2008 | Acre | F04D 29/164 415/177 |
| 2010/0111667 | A1 | 5/2010 | Stagg et al. | |
| 2023/0407876 | A1 * | 12/2023 | Fukui | F04D 29/164 |

* cited by examiner

FAN

CROSS-REFERENCE TO RELATED APPLICATION

The present application is based on PCT filing PCT/JP2020/048170, filed Dec. 23, 2020, the entire contents of which are incorporated herein by reference.

TECHNICAL FIELD

The present disclosure relates to a fan including a boss.

BACKGROUND ART

A fan such as an axial flow fan and a mixed flow fan includes an impeller including a boss and a plurality of blades. The boss is the center of rotation. The blades are provided on the outer periphery of the boss. Such a fan has a configuration in which an impeller and a motor configured to drive the impeller are provided in a cylindrical casing and in which the impeller is rotated by the motor, thus sucks air from one side of the casing, and discharges the air that has passed through the impeller from the other side of the casing. Examples of such a fan include an axial flow fan in which an inner side wall is provided in front of an impeller to be located inside a casing and to overlap the casing and in which a second suction path is formed between the inner side wall and an inner surface of the casing (see, for example, Patent Literature 1). The axial flow fan in Patent Literature 1 has a configuration in which the inner side wall has a uniform thickness, the downstream side of the inner side wall is parallel to the inner surface of the casing, and a discharge opening, closer to the impeller than is the other opening, of the second suction path faces the downstream side in the axial direction. In addition, the axial flow fan in Patent Literature 1 has a configuration in which a side end edge, closer to the suction side than is the other end edge, of the inner side wall has a bell mouth shape and in which a suction opening, opposite to the impeller, of the second suction path faces, at the upstream side from the casing, outward in radial directions of the casing.

CITATION LIST

Patent Literature

Patent Literature 1: Japanese Patent No. 3491342

SUMMARY OF INVENTION

Technical Problem

The axial flow fan in Patent Literature 1 is capable of reducing noise generated between the impeller and the inner surface of the casing by inhibiting occurrence of a leakage flow toward the upstream side at an outer peripheral end portion of a blade by use of the airflow that has entered the casing through the second suction path. However, the inner side wall (bell mouth) of the axial flow fan in Patent Literature 1 is parallel to the inner surface of the casing in the vicinity of the discharge opening. Thus, the respective airflows that have passed through a main flow path and the second suction path are discharged in the axial direction and move straight toward the downstream side. Accordingly, the airflow discharged from the main flow path and the airflow discharged from the discharge opening of the second suction path may interfere with an outer peripheral portion of a blade, thus reducing a noise reduction effect and blowing performance in some cases. In particular, in the axial flow fan disclosed in Patent Literature 1 having a configuration in which the outer peripheral ends of the respective blades are located outside the lower end of the inner side wall in radial directions, an airflow is highly likely to interfere with the outer peripheral portion of each blade, thus reducing the noise reduction effect and the blowing performance in some cases.

The present disclosure is made to solve such a problem, and an object of the present disclosure is to provide a fan that has an increased noise reduction effect and that is capable of inhibiting a reduction in blowing performance.

Solution to Problem

A fan according to an embodiment of the present disclosure includes an impeller including a boss and a plurality of blades, the boss having a columnar shape and being driven to rotate by a motor, the plurality of blades being provided radially from the boss; an air guide portion through which an airflow moves from one end to the other end of the air guide portion, the air guide portion having a cylindrical shape and being provided to cover an outer peripheral end of each of the plurality of blades; and a bell mouth having an annular shape, the bell mouth being provided to extend, to a position that is upstream from the one end of the air guide portion, from a position that is downstream from the one end of the air guide portion and that is upstream from the impeller, the bell mouth defining a first suction passage inside the bell mouth and defining, together with an inner surface of the air guide portion, a second suction passage outside the bell mouth. Between an upstream end point located in an inlet of the first suction passage and a downstream end point located in an outlet of the first suction passage of the bell mouth, the bell mouth includes a minimum possible radius point to which a distance, in a radial direction, from a rotation axis of the boss is smaller than a distance, in the radial direction, from the rotation axis to the downstream end point.

Advantageous Effects of Invention

According to an embodiment of the present disclosure, the minimum possible radius point exists between the upstream end point and the downstream end point of the bell mouth. Thus, an airflow includes a component moving toward the outside in a radial direction in the vicinity of the downstream end point of the bell mouth, and an airflow discharged toward the impeller includes a component moving toward the outer periphery. As a result, an airflow discharged from the second suction passage is less likely to interfere with an outer peripheral portion of each blade compared with the existing fan. Thus, it is possible to increase the flow rate at which air flows in a space between the blade and the air guide portion compared with the existing fan. As a result, it is possible to increase a noise reduction effect and to inhibit a reduction in blowing performance compared with the existing fan.

DESCRIPTION OF EMBODIMENTS

Embodiment 1

Figure 1:
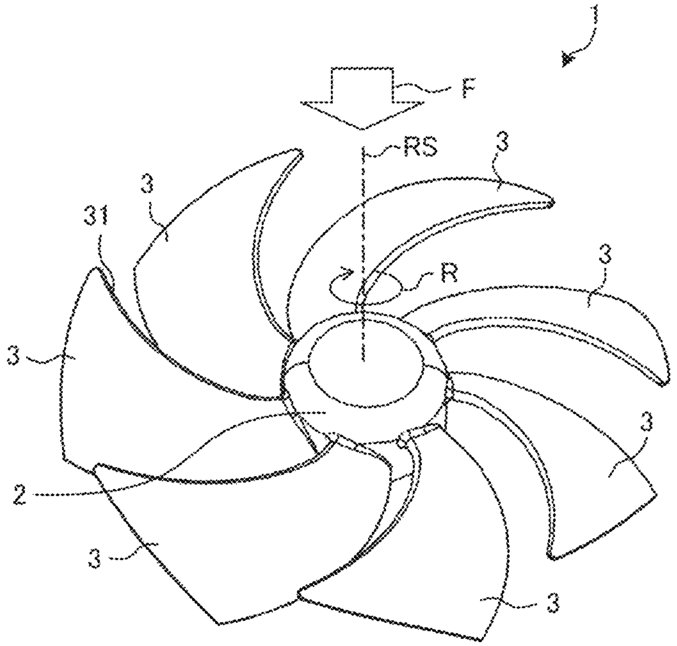
FIG. 1 is a perspective view illustrating an impeller of a fan according to Embodiment 1.
Figure 2:
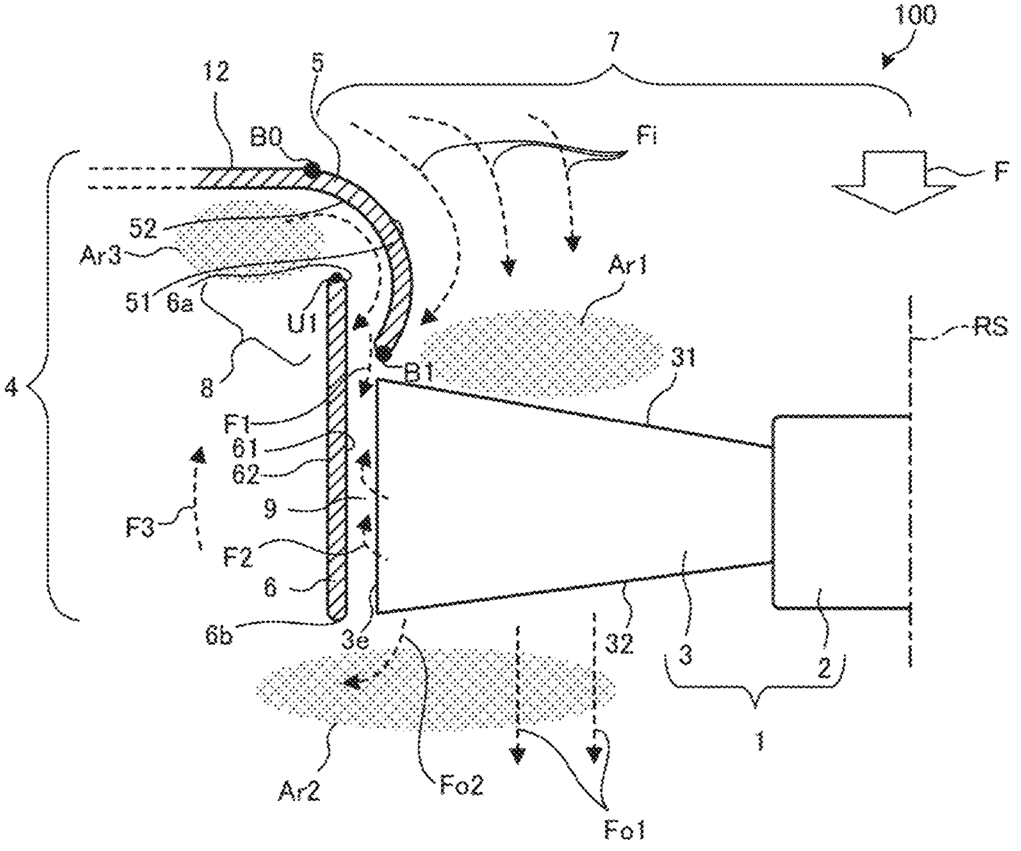
FIG. 2 is a schematic view illustrating a section, in a radial direction, of the fan according to Embodiment 1.

FIG. 1 is a perspective view illustrating an impeller 1 of a fan according to Embodiment 1. FIG. 2 is a schematic view illustrating a section, in a radial direction, of a fan 100 according to Embodiment 1. Specifically, FIG. 2 is a sectional view in which a section of the fan 100 including a rotation axis RS is rotationally projected on a plane parallel to the rotation axis RS. The configuration of the fan 100 will be described with reference to FIGS. 1 and 2.

As illustrated in FIG. 2, the fan 100 includes a casing 4 and the impeller 1, which is disposed in the casing 4. In addition, the fan 100 includes a motor (not illustrated). The fan 100 is, for example, an axial flow fan. In the example illustrated in FIG. 1, the fan 100 includes a propeller fan impeller as the impeller 1. As illustrated in FIG. 1, the impeller 1 is formed by a boss 2, which has a substantially columnar shape (including a truncated cone shape), and a plurality of blades 3, which are attached to the outer periphery of the boss 2. The motor (not illustrated) is connected to the boss 2 and disposed inside the boss 2 or on the downstream side of the boss 2. The boss 2 is driven to rotate around the rotation axis RS by the motor. In figures, an arrow R represents the direction in which the impeller 1 rotates, and a white arrow F represents the direction of an airflow to be sucked into the impeller 1. The impeller 1 sucks and discharges an airflow in the axial direction of the rotation axis RS (direction of the arrow F).

(Blades 3)

The plurality of blades 3 are provided radially from the boss 2 toward the outside in radial directions. FIG. 1 illustrates a case in which seven blades 3 are provided, but the number of the blades 3 is not particularly limited to seven. The blades 3 each have a predetermined three-dimensional shape. The blade 3 is a swept-forward blade having a blade leading edge 31, which faces in the rotation direction (direction of the arrow R) and extends forward.

(Boss 2)

The central part of the boss 2 is connected to the motor (not illustrated). The impeller 1 is rotated by receiving driving force of the motor.

(Casing 4)

As illustrated in FIG. 2, the casing 4 includes an air guide portion 6, which has a cylindrical shape and covers the outer periphery of the impeller 1, that is, outer peripheral ends 3*e* of the plurality of respective blades 3, and a bell mouth 5, which has an annular shape and guides air into the air guide portion 6. In addition, the casing 4 includes a flange portion 12, which is provided to be continuous with the bell mouth 5.

(Air Guide Portion 6)

The air guide portion 6 has, for example, a cylindrical shape. The impeller 1 is disposed in the air guide portion 6 such that the axis of the air guide portion 6 coincides with the rotation axis RS of the impeller 1. An airflow is sucked into the air guide portion 6 from one end, located upstream, of the air guide portion 6 and is discharged from the other end, located downstream, of the air guide portion 6 through the impeller 1. That is, in the direction of an airflow that is to pass through the impeller 1 (direction of the arrow F), a suction side opening 6*a* of the air guide portion 6 is located upstream, a discharge side opening 6*b* of the air guide portion 6 is located downstream, and an airflow moves from the one end to the other end of the air guide portion 6. In the following description, the most upstream part of the air guide portion 6 is referred to as an upstream end point U1.

In the example illustrated in FIG. 2, the air guide portion 6 is formed by only a straight pipe portion whose inner diameter, that is, the distance between the rotation axis RS and an inner surface 61 of the air guide portion 6, is uniform from the suction side opening 6*a* to the discharge side opening 6*b*. The shape of the air guide portion 6 is not limited to such a shape. The air guide portion 6 may be formed by combining, for example, a straight pipe portion that covers the outer periphery of the impeller 1, a contraction pipe portion whose inner diameter is gradually reduced toward the downstream side, and an expanding pipe portion whose inner diameter is gradually increased toward the downstream side. When a mixed flow impeller 1 is used, for example, the air guide portion 6 may be formed by only an expanding pipe portion, such as a hollow truncated cone, whose inner diameter is gradually increased toward the downstream side.

(Bell Mouth 5)

The bell mouth 5 has a cylindrical shape whose inner diameter varies in the axial direction of the rotation axis RS. The bell mouth 5 is disposed in the vicinity of the suction side opening 6*a* of the air guide portion 6 such that the bell mouth 5 partially overlaps the air guide portion 6 in the axial direction of the rotation axis RS. More specifically, the bell mouth 5 is provided to extend, to a position that is upstream from the suction side opening 6*a* of the air guide portion 6, from a position that is downstream from the suction side opening 6*a* of the air guide portion 6 and that is upstream from the impeller 1. The bell mouth 5 is disposed such that the central axis of the bell mouth 5 coincides with the rotation axis RS of the impeller 1 and the central axis of the air guide portion 6.

A first suction passage 7 is formed inside the bell mouth 5. A second suction passage 8 is formed between the bell mouth 5 and the inner surface 61 of the air guide portion 6. That is, the first suction passage 7 including the rotation axis RS is formed at the airflow suction side of the fan 100, and the second suction passage 8 is formed around the outer periphery of the first suction passage 7 with the bell mouth 5 interposed between the first suction passage 7 and the second suction passage 8. In addition, in other words, an inner peripheral surface 51 of the bell mouth 5 defines the first suction passage 7, and an outer peripheral surface 52 of the bell mouth 5 and the inner surface 61 of the air guide portion 6 define the second suction passage 8.

The bell mouth 5 is formed by, for example, a curved portion having a curved wall surface in the axial direction of the rotation axis RS. In the example illustrated in FIG. 2, the bell mouth 5 has an arc shape having a substantially uniform curvature from the airflow suction side to the airflow discharge side. In the following description, the most upstream point of the bell mouth 5 that is a starting point of a curve of the bell mouth 5 is referred to as an upstream end point B0, and the most downstream point of the bell mouth 5 is referred to as a downstream end point B1. Here, the upstream end point B0 and the downstream end point B1 are set on the inner peripheral surface 51 of the bell mouth 5.

The shape of the bell mouth 5 is not limited to the shape described above. For example, the bell mouth 5 may be formed by a plurality of curved portions from the upstream end point B0 of the bell mouth 5, which is located at an inlet of the first suction passage 7, to the downstream end point B1 of the bell mouth 5, which is located at an outlet of the first suction passage 7. Alternatively, the bell mouth 5 may be formed by combining a straight portion and curved portions such as an expanding pipe portion and a contraction pipe portion. The curved portion of the bell mouth 5 may have a single arc shape, an elliptical shape, or a shape formed by combining arcs having a plurality of curvatures that are different from each other.

An inlet of the second suction passage 8 is defined by the upstream end point U1 of the air guide portion 6 and a part, facing the upstream end point U1 of the air guide portion 6, of the outer peripheral surface 52 of the bell mouth 5. An outlet of the second suction passage 8 is defined by the downstream end point B1 of the bell mouth 5 and a part, facing the downstream end point B1 of the bell mouth 5, of the inner surface 61 of the air guide portion 6.

The inlet of the second suction passage 8 is provided to be open at the outside in a radial direction. An airflow toward the inside in the radial direction passes through the inlet of the second suction passage 8. On the other hand, the outlet of the second suction passage 8 is provided to be open to the downstream side in the direction of an airflow that is to pass through the impeller 1 (direction of the arrow F). An airflow F1, which includes a component moving toward the downstream side, passes through the outlet of the second suction passage 8. Here, the expression "moving toward the downstream side" is referred to as moving in the direction of the arrow F and parallel to the axial direction of the rotation axis RS.

The bell mouth 5 allows air in the vicinity of the inner peripheral surface 51 of the bell mouth 5 at the upstream end point B0 of the bell mouth 5 to be guided into the first suction passage 7 via the inlet of the first suction passage 7 and to be supplied to the impeller 1 located downstream. In addition, the bell mouth 5 allows air in the vicinity of the outer peripheral surface 52 of the bell mouth 5 at the upstream end point B0 of the bell mouth 5 to be guided into the second suction passage 8 via the inlet of the second suction passage 8 and to be diverted and supplied to a space 9 between the inner surface 61 of the air guide portion 6 and the outer peripheral end 3*e* of each of the plurality of blades 3.

(Flange Portion 12)

The flange portion 12 is provided around the outer periphery of the bell mouth 5 and is continuous with the upstream end point B0 of the bell mouth 5. The flange portion 12 has a flat shape extending in a direction perpendicular to the rotation axis RS. The bell mouth 5 and the flange portion 12 are smoothly continuous with each other and are, for example, integrally formed with each other. The flange portion 12 partitions off the upstream side of the inlet of the first suction passage 7 from the upstream side of the inlet of the second suction passage 8.

An airflow in the fan 100 will be described with reference to FIG. 2. An airflow Fi, which has entered the air guide portion 6 from the upstream side of the bell mouth 5 via the first suction passage 7, passes through the impeller 1. A part of the airflow (airflow Fo2) that has passed through the impeller 1 is discharged from the discharge side opening 6*b*, then moves along an outer surface 62 of the air guide portion 6 (airflow F3), and enters the air guide portion 6 again via the inlet of the second suction passage 8. The airflow that has entered the second suction passage 8 is diverted in the second suction passage 8 and moves out via the outlet of the second suction passage 8 (airflow F1). The airflow F1, which has moved out of the second suction passage 8, passes through the vicinity of the outer periphery of the impeller 1 and is discharged to the outside of the air guide portion 6 via the discharge side opening 6*b* of the air guide portion 6. In this case, the airflow F1, which has moved out of the second suction passage 8, inhibits occurrence of a leakage flow F2 toward the upstream side from the outer peripheral end 3*e* of the blade 3. On the other hand, the other part of the airflow (airflow Fo1) that has entered the air guide portion 6 via the first suction passage 7 (airflow Fi) and that has passed through the impeller 1 is discharged, in the axial direction, to the outside of the air guide portion 6 via the discharge side opening 6*b* of the air guide portion 6.

As described above, an inlet section of the fan 100 through which an airflow enters the air guide portion 6 has a configuration including the first suction passage 7 for sucking a main flow and the second suction passage 8, which is partitioned off from the first suction passage 7 by the bell mouth 5. A region Ar2, which has a pressure higher than a pressure of a region Ar1 formed at the side of the impeller 1 where an airflow enters, that is, in the vicinity of the outlet of the first suction passage 7, is formed at the side of the impeller 1 where an airflow moves out, that is, in the vicinity of the discharge side opening 6*b* of the air guide portion 6. In addition, a region Ar3, which has a pressure higher than the pressure of the region Ar1, is formed in the vicinity of the inlet of the second suction passage 8 through which the airflow F3 moves.

In addition, the flange portion 12 is provided at the upstream sides of the inlets of the first suction passage 7 and the second suction passage 8, thus inhibiting a reduction in the difference in air pressure between the region Ar1 and each of the region Ar2 and the region Ar3, each of which has a pressure higher than the pressure of the region Ar1, because of mixture of air in the region Ar1 and air in each of the region Ar2 and the region Ar3. As a result, it is possible to inhibit an airflow from entering the second suction passage 8 from the first suction passage 7 and the outer peripheral end 3*e* of the blade 3, to reduce the leakage flow F2, which passes through the impeller 1, and to thus discharge the airflow in the axial direction highly efficiently. In addition, the airflow F3, which moves along the outer surface 62 of the air guide portion 6, and that has been the airflow Fo2, which is an outer peripheral part of the airflow discharged from the air guide portion 6 through the impeller 1, is guided into the inlet of the second suction passage 8 by the flange portion 12, thus forming a flow that enters the second suction passage 8.

Figure 3:
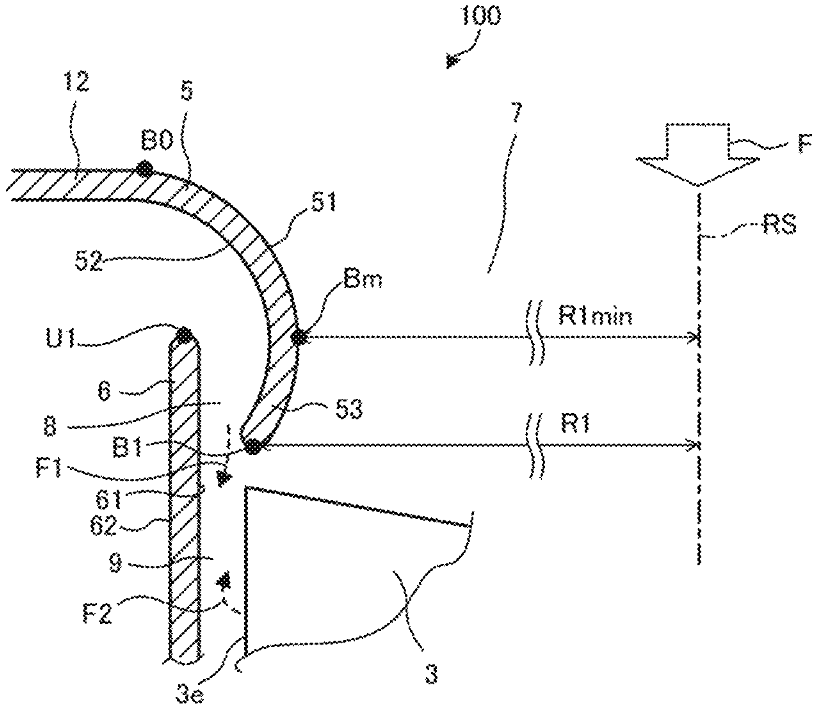
FIG. 3 is a partial enlarged view of FIG. 2.

FIG. 3 is a partial enlarged view of FIG. 2. The positional relationship between the bell mouth 5 and the air guide portion 6 and the shape of the bell mouth 5 will be described with reference to FIG. 3. The downstream end point B1 of the bell mouth 5 is located closer to the inner periphery than is the upstream end point U1 of the air guide portion 6 and downstream, in an airflow, of the upstream end point U1 of the air guide portion 6. In addition, in the example illustrated in FIG. 3, the upstream end point B0 of the bell mouth 5 is located closer to the outer periphery than is the upstream end point U1 of the air guide portion 6 and upstream, in an airflow, of the upstream end point U1 of the air guide portion 6.

The bell mouth 5 has a shape in which the inner diameter of the bell mouth 5 at its upstream end portion including the upstream end point B0 is gradually reduced as the distance from the upstream end point B0 increases and in which the inner diameter of the bell mouth 5 at its downstream end portion including the downstream end point B1 is gradually increased as the distance from the downstream end point B1 reduces. That is, the bell mouth 5 has a shape in which the inner diameter of the bell mouth 5 is gradually reduced and then gradually increased from the upstream end point B0 to the downstream end point B1.

It is sufficient that the bell mouth 5 have a shape in which a downstream end portion 53, which includes the downstream end point B1, faces outward in a radial direction. In other words, between the upstream end point B0 and the downstream end point B1, the bell mouth 5 includes a minimum possible radius point Bm, to which the distance, in the radial direction, from the rotation axis RS of the boss 2 is smaller than the distance, in the radial direction, from the rotation axis RS to the downstream end point B1. That is, a distance R1, in the radial direction, between the downstream end point B1 and the rotation axis RS and a distance R1 min, in the radial direction, between the minimum possible radius point Bm and the rotation axis RS satisfy the relationship of R1>R1 min. In the example illustrated in FIG. 3, the minimum possible radius point Bm is set on the inner peripheral surface 51 of the bell mouth 5. In addition, the distance R1 min, in the radial direction, between the minimum possible radius point Bm of the bell mouth 5 and the rotation axis RS of the boss 2 is smaller than a distance, in the radial direction, between the upstream end point B0 of the bell mouth 5 and the rotation axis RS of the boss 2. The minimum possible radius point Bm of the bell mouth 5 is a point provided closer to the inner periphery in the radial direction than is each of the upstream end point B0 and the downstream end point B1 and represents a part, closest to the rotation axis RS in the radial direction, of the bell mouth 5 illustrated in FIG. 3, which has a shape projecting inward. The bell mouth 5 is disposed to have a positional relationship with the air guide portion 6 such that the position of the minimum possible radius point Bm of the bell mouth 5 in the axial direction and the position of the upstream end point U1 of the air guide portion 6 in the axial direction substantially coincide with each other.

In the example illustrated in FIG. 3, the upstream end point B0, the downstream end point B1, and the minimum possible radius point Bm are each set as a point representing a specific position on the inner peripheral surface 51 of the bell mouth 5, which defines the first suction passage 7. The bell mouth 5 is formed by bending a plate-like component having a uniform thickness and thus has the shape in which the relationship of R1>R1 min is satisfied and in which the minimum possible radius point Bm, to which the distance from the rotation axis RS is minimum possible, is provided between the upstream end point B0 and the downstream end point B1 of the bell mouth 5.

In addition, in the example illustrated in FIG. 3, the part of the inner peripheral surface 51 of the wall portion from the minimum possible radius point Bm to the downstream end point B1 of the bell mouth 5 has a curved shape in which the inner diameter of the bell mouth 5 is gradually increased from the minimum possible radius point Bm to the downstream end point B1. The outer peripheral surface 52 also has a curved shape from the minimum possible radius point Bm to the downstream end point B1 along the inner peripheral surface 51. The bell mouth 5 may be formed to be linearly continuous from the minimum possible radius point Bm to the downstream end point B1. However, the bell mouth 5 is preferably formed to be gently curvilinearly continuous from the minimum possible radius point Bm to the downstream end point B1 to inhibit separation of an airflow in the vicinity of the bell mouth 5.

As described above, the downstream end portion 53 of the bell mouth 5 is formed to face outward in a radial direction. This configuration enables an airflow in the region Ar1, which is located at the suction side of the impeller 1, illustrated in FIG. 2 and an airflow in the region Ar2, which is located at the discharge side of the impeller 1, illustrated in FIG. 2 to be inhibited from being mixed through the space 9. Thus, it is possible to inhibit occurrence of the leakage flow F2 in the space 9 and to thus reduce noise due to the leakage flow F2.

Incidentally, for example, in a fan that includes an air guide portion integrally provided with a bell mouth, and an inlet section having only one suction passage, blades are rotated around a rotation axis, thus generating a leakage flow toward the upstream side at an outer peripheral portion of a blade. Then, interference between the leakage flow and an inner peripheral surface of the bell mouth may generate turbulence to increase noise.

On the other hand, in the fan 100 in Embodiment 1, the bell mouth 5 and the air guide portion 6 are disposed to partially overlap each other. Thus, it is possible to reduce the leakage flow F2 in the space 9 by use of the airflow F1, which includes a component moving toward the downstream side and has passed through the second suction passage 8, and to thus reduce noise.

In addition, in the fan 100 in Embodiment 1, the downstream end portion of the bell mouth 5 is formed such that the inner diameter of the bell mouth 5 is gradually increased. Thus, the airflow F1, which has passed through the outlet of the second suction passage 8, includes a component moving toward the outside in a radial direction in addition to the component moving toward the downstream side. Accordingly, the airflow F1, which has passed through the outlet of the second suction passage 8, moves toward the outer periphery and the downstream side between the blade 3 and the air guide portion 6. Thus, it is possible to reduce interference between the airflow F1 and the outer peripheral portion of each blade 3.

In an existing fan, a downstream end portion of a bell mouth is formed parallel to an inner surface of an air guide portion. Thus, an airflow F1, which has passed through a second suction passage, is highly likely to directly interfere with a blade. In particular, in an existing configuration in which the outer peripheral portion of the blade 3 overlaps an outlet of the second suction passage when the fan is projected in the axial direction, the airflow F1, which has moved out of the second suction passage 8, directly interferes with the outer peripheral portion of the blade.

In addition, in the existing fan, the air pressure in an inlet of a first suction passage and the air pressure in an inlet of the second suction passage are substantially equal to each other, and the downstream end portion of the bell mouth is formed parallel to the inner surface of the air guide portion.

Thus, in the existing fan, air is less likely to flow into the second suction passage whose part at the downstream end portion of the bell mouth is smaller than a part of the first suction passage at the downstream end portion of the bell mouth. Accordingly, it is difficult to achieve an air velocity required to reduce a leakage flow.

On the other hand, in the fan 100 in Embodiment 1, as illustrated in FIG. 3, the bell mouth 5 includes the minimum possible radius point Bm, which satisfies the relationship of R1>R1 min, between the upstream end point B0 and the downstream end point B1. Thus, the downstream end point B1 of the bell mouth 5 is located outside the minimum possible radius point Bm in a radial direction. Accordingly, the downstream end portion 53 of the bell mouth 5 serves as a diffuser to spread the airflow Fi, which moves toward the impeller 1 through the first suction passage 7, toward the outer periphery. As a result, in the vicinity of the downstream end portion 53 of the bell mouth 5, the direction of an airflow discharged from the outlet of the first suction passage 7 is inclined toward the outer periphery compared with the case of the existing fan, thus reducing interference between an airflow discharged toward the impeller 1 and the blade 3 and interference between a wake formed downstream of the bell mouth 5 and the blade 3. In addition, provision of the flange portion 12 enables an increase in the amount of airflow entering the second suction passage 8 and an increase in the velocity of an airflow passing through the second suction passage 8 compared with the existing fan that does not include the flange portion 12. Thus, it is possible to increase an effect of reducing the leakage flow F2.

In addition, in Embodiment 1, as illustrated in FIG. 2, the shape of the downstream end portion of the bell mouth 5 inhibits an airflow in the region Ar1, which is located in the outlet of the first suction passage, and an airflow in the region Ar2, which is located at the discharge side of the impeller 1, from being mixed through the space 9 between the blade 3 and the air guide portion 6. Accordingly, the pressure in the region Ar2, which is located at the discharge side of the impeller 1, and the pressure in the region Ar3, which is located in the vicinity of the inlet of the second suction passage 8, are each kept higher than the pressure in the region Ar1, which is located in the outlet of the first suction passage. Thus, an airflow easily moves into the second suction passage 8. As a result, it is possible to also achieve an effect of reducing a leakage flow F2 that has a high velocity by use of the airflow that is discharged from the second suction passage 8 and whose velocity is higher than the velocity in the existing fan.

Figure 4:
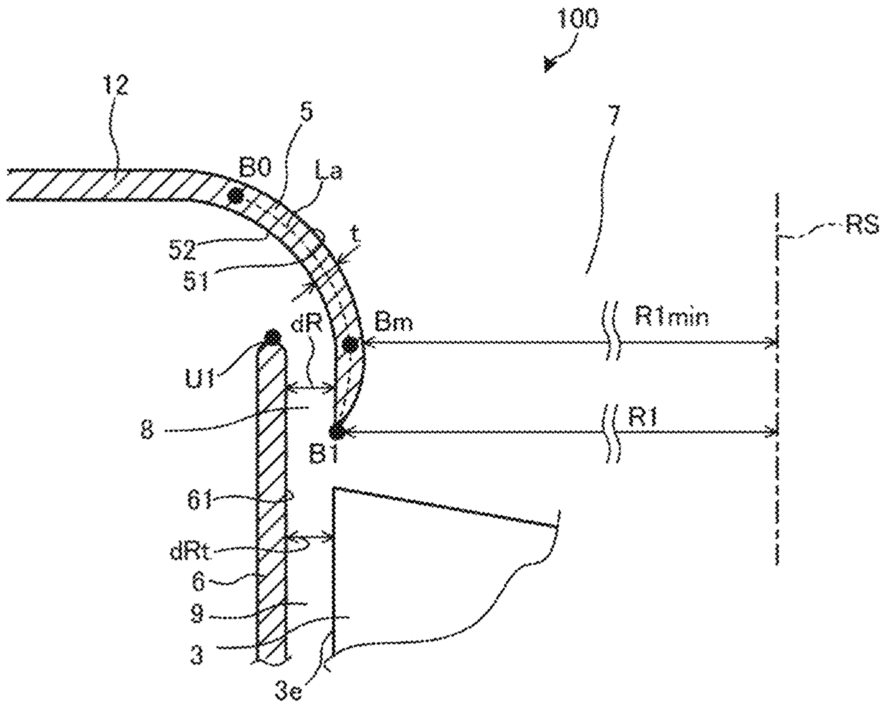
FIG. 4 is a schematic view illustrating a modification example of a bell mouth of the fan illustrated in FIG. 3.

FIG. 4 is a schematic view illustrating a modification example of the bell mouth 5 of the fan illustrated in FIG. 3. When the bell mouth 5 has a certain thickness, in consideration of a thickness t of the bell mouth 5, the minimum possible radius point Bm may be set at the midpoint between the inner peripheral surface 51 and the outer peripheral surface 52, that is, the center of the thickness t. In the modification example illustrated in FIG. 4, the thickness t of the bell mouth 5 is small at its tip end. Thus, the modification example illustrated in FIG. 4 has a configuration in which the relationship of R1>R1min is satisfied. The manner in which the distance between the bell mouth 5 and the rotation axis RS is defined in this case will be described with reference to FIG. 4.

In the modification example illustrated in FIG. 4, the bell mouth 5 is formed by bending a tapered plate-like component, and the upstream end point B0, the downstream end point B1, and the minimum possible radius point Bm of the bell mouth 5 are set on a virtual center line La of the thickness t of the bell mouth 5. The bell mouth 5 is formed such that the distance R1, in a radial direction, between the rotation axis RS and the downstream end point B1 of the bell mouth 5 is larger than the distance R1min, in the radial direction, between the rotation axis RS and the minimum possible radius point Bm of the bell mouth 5. In FIG. 4, the distance, in the radial direction, between the inner peripheral surface 51 and the rotation axis RS is increased toward the downstream side from the minimum possible radius point Bm to the downstream end point B1 of the bell mouth 5, and a distance dR, in the radial direction, between the inner surface 61 of the air guide portion 6 and the outer peripheral surface 52 of the bell mouth 5, which overlaps the air guide portion 6 in the axial direction, is uniform. The inner peripheral surface 51 of the bell mouth 5 has, for example, a curved shape in which the inner diameter of the bell mouth 5 is gradually increased from the minimum possible radius point Bm to the downstream end point B1.

The bell mouth 5 in the modification example has a shape in which the thickness t of the bell mouth 5 is reduced toward the downstream side and in which the inner peripheral surface 51 is widened outward in the radial direction from the minimum possible radius point Bm to the downstream end point B1. Thus, similarly to the example illustrated in FIG. 3, it is possible to achieve an effect of reducing interference with each blade 3. In particular, when the distance dR, in the radial direction, between the inner surface 61 of the air guide portion 6 and the outer peripheral surface 52 of the bell mouth 5 is uniform as illustrated in FIG. 4, undercut processing is not required in molding of the bell mouth 5, thus facilitating production of the bell mouth 5 compared with the case of the outer peripheral surface 52 having a curved shape.

Figure 5:
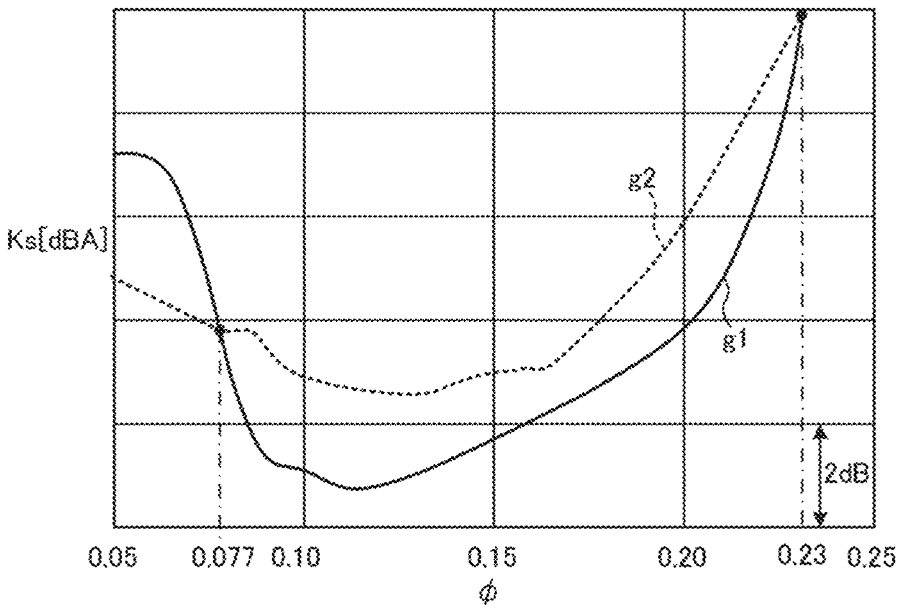
FIG. 5 is a graph illustrating the relationship between a flow rate coefficient and a specific noise level of the fan illustrated in FIG. 4.

FIG. 5 is a graph illustrating the relationship between a flow rate coefficient 9 and a specific noise level Ks (dBA) of the fan 100 illustrated in FIG. 4. In FIG. 5, a solid line g1 represents the results obtained by use of the fan 100 illustrated in FIG. 4, and, as a comparative example, a dashed line g2 represents the results obtained by use of a fan using a common duct-type casing including an air guide portion and a bell mouth that are continuous with each other. Specifically, the solid line g1 represents the results obtained by use of the fan 100 that uses the tapered bell mouth 5 illustrated in FIG. 4 and in which the distance dR, in the radial direction, between the inner surface 61 of the air guide portion 6 and the outer peripheral surface 52 of the bell mouth 5 is smaller than a distance dRt, in the radial direction, between the inner surface 61 of the air guide portion 6 and the outer peripheral end 3*e* of the blade 3. The same impeller 1 is used in the fan 100 illustrated in FIG. 4 and the fan using the duct-type casing. The flow rate coefficient φ is an index that is determined by, for example, an air flow rate, an annular passage area, and a peripheral velocity at blade tip ends and that represents the performance of the fan 100.

According to FIG. 5, at a flow rate coefficient φ in the range of from 0.077 to 0.23, the specific noise level Ks (dBA) obtained by use of the fan 100 in Embodiment 1 is less than or equal to the specific noise level Ks (dBA) obtained by use of the fan using the duct-type casing. That is, it is clear from FIG. 5 that the fan 100 using the casing 4 according to Embodiment 1 is capable of achieving a noise reduction effect in a wider flow rate range within a flow rate range in which the flow rate coefficient φ ranges from 0.077 to 0.23 compared with the fan using the duct-type casing.

As described above, the fan 100 in Embodiment 1 includes the impeller 1, which includes the plurality of blades 3, the air guide portion 6, which has a cylindrical shape and is provided to cover the outer peripheral ends 3*e* of the plurality of respective blades 3, and the bell mouth 5, which has an annular shape. The impeller 1 includes the boss 2, which has a columnar shape and is driven to rotate by the motor. The plurality of blades 3 are provided radially from the boss 2. An airflow moves inside the air guide portion 6 from the one end to the other end of the air guide portion 6. The bell mouth 5 is provided to extend, to a position that is upstream from the one end of the air guide portion 6, from a position that is downstream from the one end of the air guide portion 6 and that is upstream from the impeller 1. The first suction passage 7 is formed inside the bell mouth 5. The outside of the bell mouth 5 and the inner surface of the air guide portion 6 define the second suction passage 8. Between the upstream end point B0, which is located in the inlet of the first suction passage 7, and the downstream end point B1, which is located in the outlet of the first suction passage 7, the bell mouth 5 includes the minimum possible radius point Bm, to which the distance, in the radial direction, from the rotation axis RS of the boss 2 is smaller than the distance, in the radial direction, from the rotation axis RS to the downstream end point B1.

Thus, the minimum possible radius point Bm exists between the upstream end point B0 and the downstream end point B1 of the bell mouth 5. Accordingly, an airflow includes a component moving toward the outside in a radial direction in the vicinity of the downstream end point B1 of the bell mouth 5, and the airflow that enters from the second suction passage 8 moves along the inner surface of the air guide portion 6. Thus, compared with the existing fan, it is possible to reduce interference between the airflow F1 discharged from the second suction passage 8 and the outer peripheral portion of each blade 3 and to thus increase the flow rate at which air flows in the space 9. As a result, it is possible to reduce the leakage flow F2 from the outer peripheral end 3*e* of the blade 3 compared with the existing fan, to increase a noise reduction effect, and to thus inhibit a reduction in blowing performance.

In addition, the inner peripheral surface 51, which defines the first suction passage 7, of the bell mouth 5 is formed such that the distance, in the radial direction, between the bell mouth 5 and the rotation axis RS is gradually increased from the minimum possible radius point Bm to the downstream end point B1 in a section along the rotation axis RS. Thus, it is possible to guide an airflow moving toward the downstream side with separation of the airflow from the bell mouth 5 inhibited in the vicinity of the minimum possible radius point Bm.

In addition, the inner peripheral surface 51 has a curved shape, and the outer peripheral surface 52, which defines the second suction passage 8 together with the inner surface 61 of the air guide portion 6, of the bell mouth 5 has a curved shape along the inner peripheral surface 51. Thus, airflows that move in the vicinity of the downstream end portion 53 of the bell mouth 5 incline and move, away from the rotation axis, along the inner peripheral surface 51 and the outer peripheral surface 52, each of which has a curved shape. Accordingly, interference between an airflow discharged from the first suction passage 7 and a wake or each blade 3 is reduced at a side of the inner peripheral surface 51, and interference between an airflow discharged from the second suction passage 8 and each blade 3 is reduced at a side of the outer peripheral surface 52. As a result, it is possible to further increase a noise reduction effect.

In addition, the outer peripheral surface 52, which defines the second suction passage 8 together with the inner surface 61 of the air guide portion 6, of the bell mouth 5 is formed such that the distance dR, in the radial direction, between the inner surface 61 of the air guide portion 6 and the outer peripheral surface 52 of the bell mouth 5 is uniform in the axial direction. Thus, it is possible to mold, without complex processing such as undercut processing, the fan having an increased noise reduction effect by reducing interference between an airflow and a wake or each blade 3 by use of the inner peripheral surface 51, which has a curved shape, in the vicinity of the downstream end portion 53 of the bell mouth 5, thus facilitating production of the bell mouth 5.

In addition, the fan 100 includes the flange portion 12, which is provided to be continuous with the upstream end point B0 of the bell mouth 5. The flange portion 12 partitions off the upstream side of the inlet of the first suction passage 7 from the upstream side of the inlet of the second suction passage 8. Thus, it is possible to avoid mixture of an airflow in the inlet of the first suction passage 7 and an airflow in the inlet of the second suction passage 8, to suck a high-pressure airflow into the second suction passage 8, and to thus increase an effect of reducing the leakage flow F2 by use of an airflow whose velocity is higher than the velocity in the existing fan.

Embodiment 2

Figure 6:
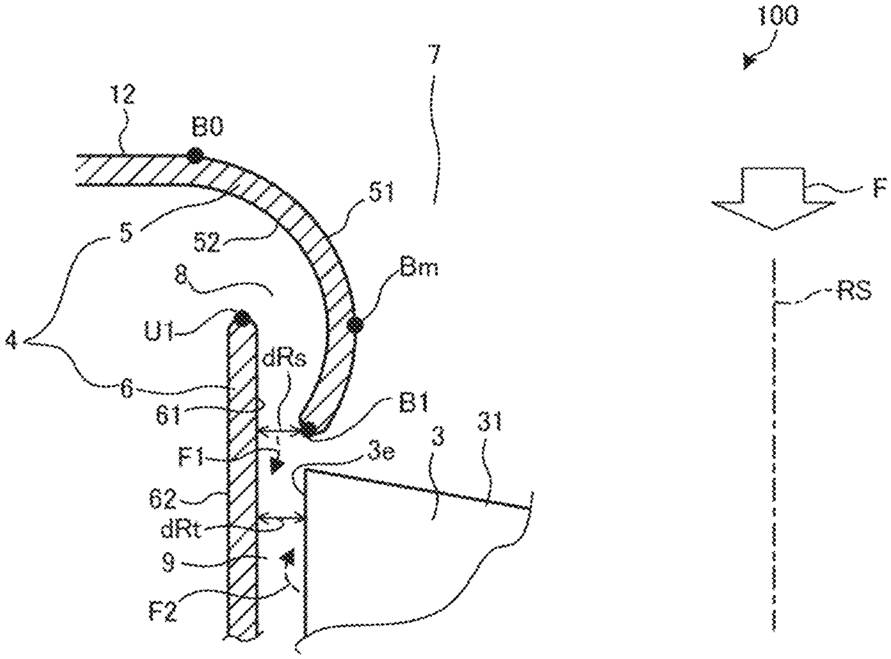
FIG. 6 is a schematic partial enlarged view illustrating a section, in a radial direction, of a fan according to Embodiment 2.

FIG. 6 is a schematic partial enlarged view illustrating a section, in a radial direction, of a fan 100 according to Embodiment 2. In Embodiment 1, the relationship between the opening width of the outlet of the second suction passage 8 and the size of the space 9 (tip clearance) between the air guide portion 6 and the outer peripheral end 3*e* of the blade 3 is not particularly defined. However, in the fan 100 in Embodiment 2, this relationship is defined to further reduce interference between an airflow and each blade 3. In the fan 100 in Embodiment 2, components similar to components in Embodiment 1 have the same reference signs, and their descriptions are omitted.

The casing 4 of the fan 100 in Embodiment 2 is formed such that a distance dRs, in the radial direction, between the inner surface 61 of the air guide portion 6 and the downstream end point B1 of the bell mouth 5 and the distance dRt, in the radial direction, between the inner surface 61 of the air guide portion 6 and the outer peripheral end 3*e* of the blade 3 satisfy the relationship of $dRt \geq dRs$.

In an existing configuration in which the outer peripheral portion of the blade 3 overlaps the outlet of the second suction passage 8 when the blade 3 is projected in the axial direction, the width of the airflow F1, which has moved out via the outlet of the second suction passage 8, is larger than the width of the leakage flow F2 from the outer peripheral end 3*e* of the blade 3. Thus, the airflow F1, which has passed through the second suction passage 8, directly comes into contact with the outer peripheral portion of the blade 3. Accordingly, the airflow is sucked into the impeller 1 at an angle different from a predetermined inflow angle. In addition, the airflow F1, which has passed through the second suction passage 8 and whose velocity is higher than the velocity of a main flow, interferes with the blade 3, thus generating turbulence. Thus, the existing fan may be incapable of achieving a sufficient noise reduction effect or of keeping blowing performance.

On the other hand, in the fan 100 in Embodiment 2, the distance dRs, in the radial direction, between the inner surface 61 of the air guide portion 6 and the downstream end point B1 of the bell mouth 5 is substantially smaller than or equal to the tip clearance (distance dRt) from the outer periphery of the blade 3. Thus, the width of the airflow F1, which has moved out of the outlet of the second suction passage 8 formed between the bell mouth 5 and the air guide portion 6, is about the distance dRs and is smaller than the tip clearance (distance dRt). Thus, it is possible to avoid direct interference between the airflow F1 and each blade 3. As a result, it is possible to inhibit generation of noise and a reduction in blowing performance caused by direct interference between the airflow F1 and each blade 3.

EMBODIMENT 3

Figure 7:
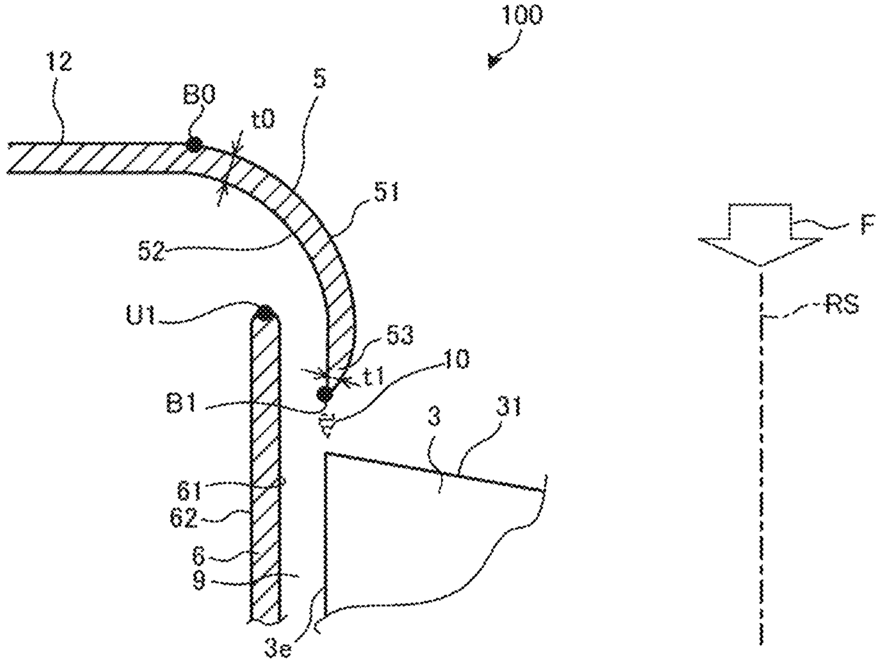
FIG. 7 is a schematic partial enlarged view illustrating a section, in a radial direction, of a fan according to Embodiment 3.

FIG. 7 is a schematic partial enlarged view illustrating a section, in a radial direction, of a fan 100 according to Embodiment 3. In Embodiment 3, the shape of the downstream end portion 53, which includes the downstream end point B1 of the bell mouth 5, differs from the shape of the downstream end portion 53 illustrated in FIG. 3 in Embodiment 1. In the fan 100 in Embodiment 3, components similar to components in Embodiment 1 have the same reference signs, and their descriptions are omitted.

The bell mouth 5 of the fan 100 in Embodiment 3 is formed such that its thickness t1 at the downstream end point B1 is smaller than its thickness t0 at the upstream end point B0. That is, the thicknesses t0 and t1 of the bell mouth 5 satisfy the relationship of t0>t1. The bell mouth 5 may have a shape in which its thickness gradually varies from the upstream end point B0 to the downstream end point B1. Alternatively, the bell mouth 5 may have a shape in which only the thickness of the downstream end portion 53 of the bell mouth 5 varies and in which the thickness of its part upstream from the downstream end portion 53 is uniform.

However, the inner peripheral surface 51 and the outer peripheral surface 52 of the bell mouth 5 each preferably have a curved shape as illustrated in FIG. 7 to cause an airflow to move along the bell mouth 5. In the example illustrated in FIG. 7, the shape of the downstream end portion 53 of the bell mouth 5 is a triangle whose tip end has an acute angle but is not particularly limited to such a shape as long as at least the downstream end portion 53 of the bell mouth 5 has a tapered shape, that is, a shape whose thickness is reduced toward the downstream side. The shape of the downstream end portion 53 of the bell mouth 5 may be, for example, a shape in which the inner peripheral surface 51 and the outer peripheral surface 52 are continuous with each other through an arc-shaped end face. To minimize, as much as possible, a wake region 10 (dead region), which is formed downstream of the downstream end point B1 of the bell mouth 5, the shape of the downstream end portion 53 of the bell mouth 5 is preferably thin to be the shape of an airfoil (streamlined) trailing edge.

Turbulence occurs, because of a wake and a velocity shear layer, at the downstream side of the downstream end portion 53, where airflows join together, of the bell mouth 5, where the first suction passage 7 is provided at a side of the inner peripheral surface 51 and where the second suction passage 8 is provided at a side of the outer peripheral surface 52. The size of the wake region 10 varies depending on the shape of the downstream end portion 53 of the bell mouth 5. When the blade 3 is disposed in the wake region 10, interference with the blade 3 may generate turbulence, thus increasing noise. Accordingly, it is preferable to make the wake region 10 as small as possible.

The bell mouth 5 of the fan 100 in Embodiment 3 has a shape in which the downstream end portion 53 is tapered. Thus, it is possible to make the wake region 10 smaller than the wake region in an existing bell mouth whose thickness is uniform and that has an end face perpendicular to the rotation axis RS and to reduce turbulence due to a velocity shear layer. As a result, compared with the existing fan, it is possible to reduce interference between the wake region 10 and each blade 3 and to thus reduce noise.

Embodiment 4

Figure 8:
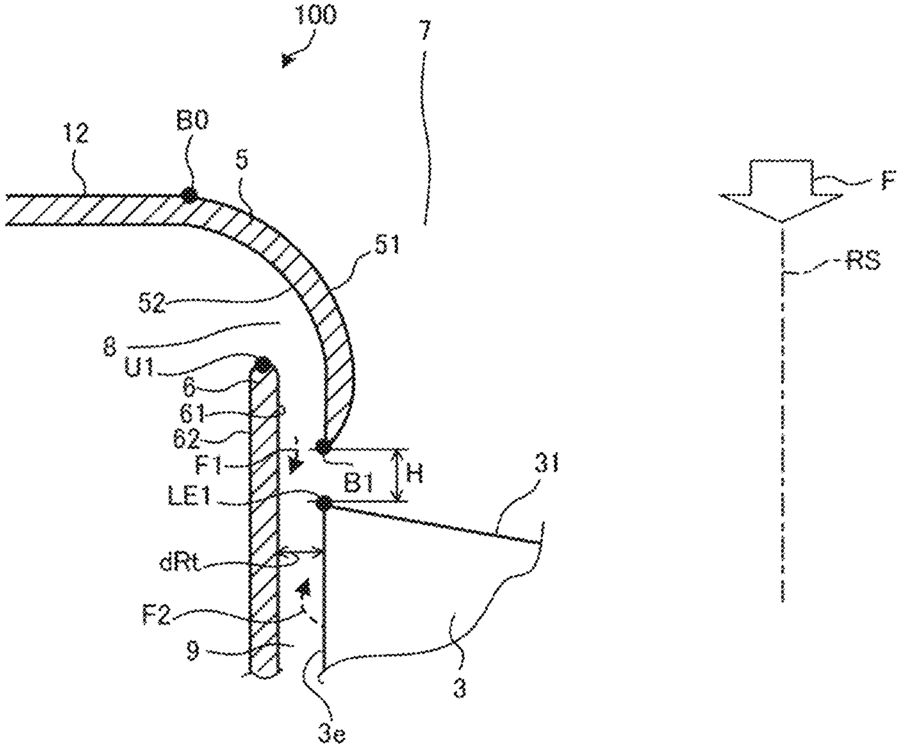
FIG. 8 is a schematic partial enlarged view illustrating a section, in a radial direction, of a fan according to Embodiment 4.

FIG. 8 is a schematic partial enlarged view illustrating a section, in a radial direction, of a fan 100 according to Embodiment 4. In Embodiments 1 to 3, the distance between the bell mouth 5 and the blade 3 is not particularly defined. However, in the fan 100 in Embodiment 4, the distance between the bell mouth 5 and the blade 3 is defined. In the fan 100 in Embodiment 4, components similar to components in Embodiment 3 have the same reference signs, and their descriptions are omitted.

In Embodiment 4, a distance H, in the axial direction, between the downstream end point B1 of the bell mouth 5 and an outer peripheral end point LE1 located at the blade leading edge 31 of the blade 3 is set to be in the distance range determined by the upper and lower limits based on the distance dRt, in the radial direction, between the inner surface 61 of the air guide portion 6 and the outer peripheral end 3*e* of the blade 3.

When the distance H, in the axial direction, between the downstream end point B1 of the bell mouth 5 and the outer peripheral end point LE1 located at the blade leading edge 31 of the blade 3 is sufficiently smaller than the distance dRt, as described with reference to FIG. 7, each blade 3 and a wake formed downstream of the bell mouth 5 may interfere with each other, thus increasing noise. In addition, it can be considered that, for example, deformation and vibrations of the impeller 1 during its rotation cause the blade 3 and the bell mouth 5 to come into contact with each other.

Thus, in Embodiment 4, the bell mouth 5 and the plurality of blades 3 are disposed such that the distance H, in the axial direction, between the downstream end point B1 of the bell mouth 5 and the outer peripheral end point LE1 located at the blade leading edge 31 of the blade 3 is larger than the distance dRt, in the radial direction, between the inner surface 61 of the air guide portion 6 and the outer peripheral end 3*e* of the blade 3.

In addition, when the distance H, in the axial direction, between the downstream end point B1 of the bell mouth 5 and the outer peripheral end point LE1 located at the blade leading edge 31 of the blade 3 is sufficiently larger than the distance dRt, the airflow F1, which has moved out of the second suction passage 8, spreads, in its moving direction, until reaching the vicinity of the outer peripheral end point LE1. Thus, when the airflow F1 whose velocity is reduced reaches the vicinity of the outer peripheral end point LE1 located at the blade leading edge 31 of the blade 3, the airflow F1 does not have a sufficient effect of reducing the leakage flow F2.

Thus, Embodiment 4 has a configuration in which the bell mouth 5 and the plurality of blades 3 are disposed such that the distance H is smaller than the value obtained by multiplying the distance dRt by 5. That is, this configuration satisfies the relationship of H<5 dRt. The upper limit is set to the distance H in this manner. Thus, it is possible to dispose the outer peripheral end point LE1 of the blade 3 at a distance from the bell mouth 5 at which the decrease in flow is small. Accordingly, the airflow F1, which has moved out of the second suction passage 8, can reach the vicinity of the outer peripheral end point LE1 of the blade 3 before spreading and slowing down. As a result, it is possible to use the airflow F1 effectively to reduce the leakage flow F2. Here, when the airflow F1, which has moved out of the second suction passage 8, is a jet, it is possible to preset the distance at which the decrease in flow is small at, for example, the potential core length as an index.

Embodiment 5

Figure 9:
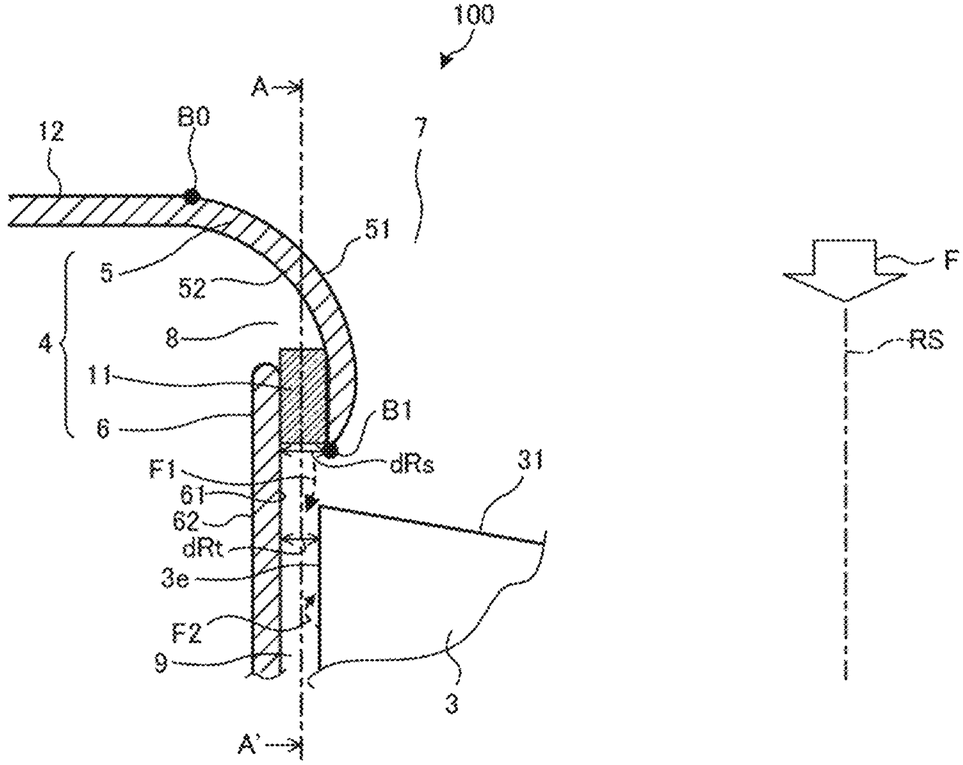
FIG. 9 is a schematic partial enlarged view illustrating a section, in a radial direction, of a fan according to Embodiment 5.
Figure 10:
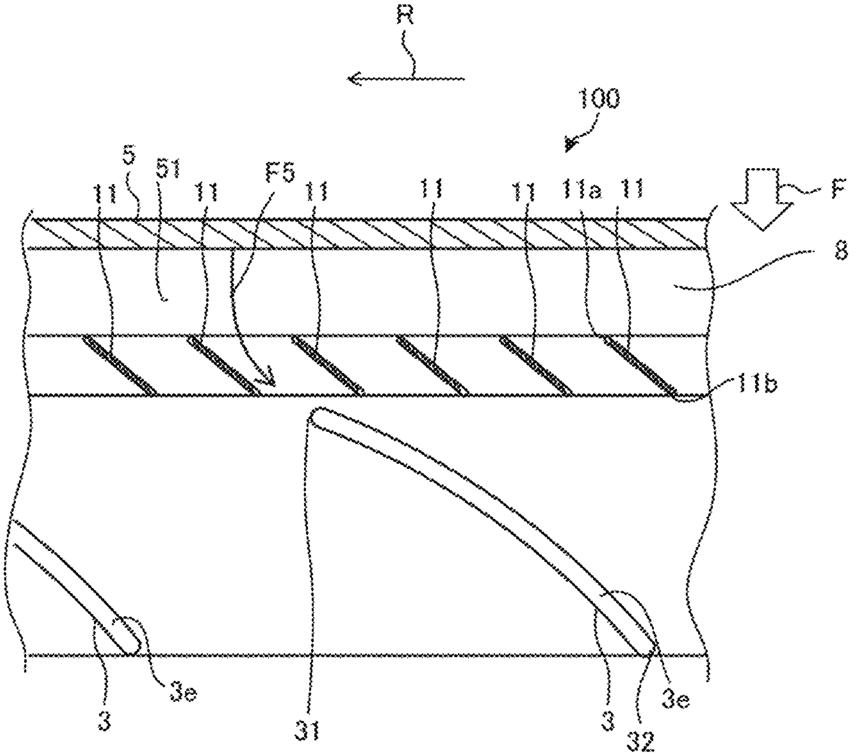
FIG. 10 is a schematic view in which a cylindrical section taken along A-A' illustrated in FIG. 9 is projected and developed.

FIG. 9 is a schematic partial enlarged view illustrating a section, in a radial direction, of a fan according to Embodiment 5. FIG. 10 is a schematic view in which a cylindrical section taken along A-A' illustrated in FIG. 9 is projected and developed. The fan 100 in Embodiment 5 differs from the fans 100 in Embodiments 1 to 4 in that the casing 4 includes a plurality of ribs 11, each of which has a plate-like shape. In addition, the fan 100 in Embodiment 5 differs from the fan 100 in Embodiment 2 in that the distance dRs, in the radial direction, between the inner surface 61 of the air guide portion 6 and the downstream end point B1 of the bell mouth 5 and the distance dRt, in the radial direction, between the inner surface 61 of the air guide portion 6 and the outer peripheral end 3*e* of the blade 3 satisfy the relationship of dRt<dRs. That is, Embodiment 5 has a configuration in which the outer peripheral portion of the blade 3 overlaps the outlet of the second suction passage 8 when the fan is projected in the axial direction of the rotation axis RS. In the fan 100 in Embodiment 5, components similar to components in Embodiment 3 have the same reference signs, and their descriptions are omitted.

In the example illustrated in FIG. 10, a blade trailing edge 32 of each blade 3 is located at a position that is downstream from the corresponding blade leading edge 31 and that is located behind the corresponding blade leading edge 31 in the rotation direction (direction of the arrow R) of the impeller 1. In the fan 100 in Embodiment 5, the bell mouth 5 and the air guide portion 6 (FIG. 9) are connected by the plurality of ribs 11, each of which has a plate-like shape. The plurality of ribs 11 are provided in the second suction passage 8 and are arranged in the circumferential direction. Each rib 11 is provided in the circumferential direction and inclined to a direction from the upstream side toward the downstream side (direction of the arrow F), that is, inclined to the axial direction of the rotation axis RS. The rib 11 thus serves to change the direction of an airflow F5, which passes through the second suction passage 8.

In the example illustrated in FIG. 10, the ribs 11 and the blades 3 are inclined in the same direction. Specifically, the rib 11 is set such that a downstream end 11*b* of the rib 11 is located behind an upstream end 11*a* of the rib 11 in the rotation direction (direction of the arrow R) of the impeller 1. The blade 3 is disposed such that the blade leading edge 31 is located between the downstream ends 11*b* of two of the ribs 11 adjacent to each other in the circumferential direction.

The plurality of ribs 11 are provided in the second suction passage 8 in this manner. Thus, it is possible to change the direction of the airflow F5, which passes through the second suction passage 8, to any direction inclined in the circumferential direction and to thus cause the airflow F1 (FIG. 9), which has moved out of the second suction passage 8, to enter the outer peripheral portion of the blade 3 at a desired angle of attack. As a result, the outlet of the second suction passage 8 does not have to be set at the outer periphery of the blade 3 to avoid interference between the airflow F1 and the outer peripheral portion of each blade 3 as in Embodiment 2. In the fan 100 in Embodiment 5, the direction of the airflow F1 from the second suction passage 8 is controlled to be along the orientation of the blade 3. Thus, it is possible to reduce interference between the airflow F1 and the outer peripheral portion of each blade 3 and to thus achieve a noise reduction effect. In addition, the airflow F1 enters the outer peripheral portion of the blade 3 at a desired angle of attack. Thus, it is possible to reduce the leakage flow F2 (FIG. 9), to send out the airflow F1, which has entered the outer peripheral portion of the blade 3, in the axial direction, and to thus increase blowing performance.

Embodiments described above can be combined and can each be modified or omitted as appropriate. For example, in the example illustrated in FIG. 10, the shape of each rib 11 is a flat shape but is not particularly limited to such a flat shape. For example, the rib 11 may have a curved shape such as an arc shape. In addition, the thickness and the shape of the rib 11 may be the thickness and the shape of a rib in an airfoil such as a stator blade.

In addition, the impeller 1 of each of the fans 100 in Embodiments 1 to 5 is an impeller for an axial flow fan but is not limited to such an impeller. The impeller 1 of each of the fans 100 in Embodiments 1 to 5 may be an impeller for a mixed flow fan. In this case, for example, the boss 2 has a truncated cone shape, and the blades 3 are provided on the outer periphery of the boss 2.

REFERENCE SIGNS LIST

1: impeller, 2: boss, 3: blade, 3*e*: outer peripheral end, 4: casing, 5: bell mouth, 6: air guide portion, 6*a*: suction side opening, 6*b*: discharge side opening, 7: first suction passage, 8: second suction passage, 9: space, 10: wake region, 11: rib, 11*a*: upstream end, 11*b*: downstream end, 12: flange portion, 31: blade leading edge, 32: blade trailing edge, 51: inner peripheral surface, 52: outer peripheral surface, 53: downstream end portion, 61: inner surface, 62: outer surface, 100: fan, Ar1: region, Ar2: region, Ar3: region, B0: upstream end point, B1: downstream end point, Bm: minimum possible radius point, F1, F3, F5, Fi: airflow, Fo1, Fo2: airflow, H: distance, Ks: specific noise level, LE1: outer peripheral end point, La: center line, R1, R1min, dR, dRs, dRt: distance, RS: rotation axis, U1: upstream end point, t, t0, t1: thickness, φ: flow rate coefficient

The invention claimed is:

1. A fan comprising:

an impeller including a boss and a plurality of blades, the boss having a columnar shape and being driven to rotate by a motor, the plurality of blades being provided radially from the boss;

an air guide portion across which an airflow moves from an upstream end to a downstream end of the air guide portion, the air guide portion having a cylindrical shape and being provided to cover an outer peripheral end of each of the plurality of blades; and a bell mouth having an annular shape, the bell mouth being provided to extend to a position that is upstream from the upstream end of the air guide portion from a position that is downstream from the upstream end of the air guide portion and that is upstream from the impeller, the bell mouth including an upstream end point and a downstream end point defining a first suction passage inside the bell mouth and defining, together with an inner surface of the air guide portion, a second suction passage outside the bell mouth, wherein the second suction passage extends uninterruptedly between the upstream end of the air guide portion and the downstream end point of the bell mouth portion;

between the upstream end point located in an inlet of the first suction passage and the downstream end point located in an outlet of the first suction passage of the bell mouth, the bell mouth including a minimum possible radius point to which a distance, in a radial direction, from a rotation axis of the boss is smaller than a distance, in the radial direction, from the rotation axis to the downstream end point.

2. The fan of claim 1, wherein an inner peripheral surface of the bell mouth, the inner peripheral surface defining the first suction passage, is formed such that an inner diameter of the bell mouth is gradually increased from the minimum possible radius point to the downstream end point in a section along the rotation axis.

3. The fan of claim 2, wherein the inner peripheral surface has a curved shape, and an outer peripheral surface of the bell mouth, the outer peripheral surface defining the second suction passage together with the inner surface of the air guide portion, has a curved shape along the inner peripheral surface.

4. The fan of claim 2, wherein an outer peripheral surface of the bell mouth, the outer peripheral surface defining the second suction passage together with the inner surface of the air guide portion, is formed such that a distance, in the radial direction, between the inner surface of the air guide portion and the outer peripheral surface of the bell mouth is uniform in an axial direction.

5. The fan of claim 1, further comprising a flange portion provided to be continuous with the upstream end point of the bell mouth, the flange portion partitioning off an upstream side of the inlet of the first suction passage from an upstream side of an inlet of the second suction passage.

6. The fan of claim 1, wherein the bell mouth is formed such that a distance, in the radial direction, between the inner surface of the air guide portion and the outer peripheral end of each of the plurality of blades is larger than or equal to a distance, in the radial direction, between the inner surface of the air guide portion and the downstream end point of the bell mouth.

7. The fan of claim 1, wherein the bell mouth is formed such that a thickness of the bell mouth at the downstream end point is smaller than a thickness of the bell mouth at the upstream end point.

8. The fan of claim 1, wherein the bell mouth and the plurality of blades are disposed such that a distance, in an axial direction, between the downstream end point of the bell mouth and an outer peripheral end point located at a leading edge of each of the plurality of blades is larger than a distance, in the radial direction, between the inner surface of the air guide portion and the outer peripheral end of each of the plurality of blades.

9. The fan of claim 8, wherein the bell mouth and the plurality of blades are disposed such that when the distance, in the axial direction, between the downstream end point of the bell mouth and the outer peripheral end point located at the leading edge of each of the plurality of blades is defined as a distance H and when the distance, in the radial direction, between the inner surface of the air guide portion and the outer peripheral end of each of the plurality of blades is defined as a distance dRt, the distance H and the distance dRt satisfy a relationship of $H<5dRt$.

10. A fan comprising:

an impeller including a boss and a plurality of blades, the boss having a columnar shape and being driven to rotate by a motor, the plurality of blades being provided radially from the boss;

an air guide portion across which an airflow moves from one end to an other end of the air guide portion, the air guide portion having a cylindrical shape and being provided to cover an outer peripheral end of each of the plurality of blades; and a bell mouth having an annular shape, the bell mouth being provided to extend to a position that is upstream from the one end of the air guide portion from a position that is downstream from the one end of the air guide portion and that is upstream from the impeller, the bell mouth defining a first suction passage inside the bell mouth and defining, together with an inner surface of the air guide portion, a second suction passage outside the bell mouth, between an upstream end point located in an inlet of the first suction passage and a downstream end point located in an outlet of the first suction passage of the bell mouth, the bell mouth including a minimum possible radius point to which a distance, in a radial direction, from a rotation axis of the boss is smaller than a distance, in the radial direction, from the rotation axis to the downstream end point;

a plurality of ribs each of which is formed in the shape of a plate, the plurality of ribs being provided in the second suction passage, the plurality of ribs connecting the bell mouth and the air guide portion, the plurality of ribs being arranged in a circumferential direction, wherein the plurality of ribs are inclined to an axial direction of the rotation axis and serve to change a direction of air to pass through the second suction passage.

* * * * *